United States Patent
Pellerin et al.

(10) Patent No.: US 7,346,563 B2
(45) Date of Patent: Mar. 18, 2008

(54) METHOD AND SYSTEM FOR FACILITATING COMMERCE VIA A COMMUNICATIONS NETWORK

(75) Inventors: Kevin Pellerin, Hopedale, MA (US); Timothy Semen, Newton, MA (US)

(73) Assignee: Staples The Office Superstore, LLC, Framingham, MA (US)

( * ) Notice: Subject to any disclaimer, the term of this patent is extended or adjusted under 35 U.S.C. 154(b) by 674 days.

(21) Appl. No.: 10/816,215

(22) Filed: Apr. 1, 2004

(65) Prior Publication Data

US 2005/0222919 A1    Oct. 6, 2005

(51) Int. Cl.
*G06F 17/30* (2006.01)
(52) U.S. Cl. .......................................... 705/27; 705/26
(58) Field of Classification Search .................. 705/26, 705/27
See application file for complete search history.

(56) References Cited

U.S. PATENT DOCUMENTS

| 2002/0184105 A1 | 12/2002 | Czuchry, Jr. et al. |
| 2003/0158796 A1* | 8/2003 | Balent ........................ 705/28 |
| 2004/0143346 A1* | 7/2004 | Francis et al. ................. 700/1 |
| 2004/0186788 A1* | 9/2004 | Czuchry et al. .............. 705/26 |
| 2004/0254828 A1* | 12/2004 | Yokota et al. ................ 705/10 |
| 2005/0010496 A1* | 1/2005 | Hoffman et al. .............. 705/27 |

FOREIGN PATENT DOCUMENTS

JP          2005049940          * 2/2005

OTHER PUBLICATIONS

Anonymous, Intuit Proseries, Accounting Technology, Oct. 2003.*
International Search Report and Written Opinion for International Application No. PCT/US05/11183 mailed Sep. 21, 2006.

* cited by examiner

*Primary Examiner*—Mark Fadok
(74) *Attorney, Agent, or Firm*—Wolf, Greenfield & Sacks, P.C.

(57) ABSTRACT

System and methods are provided whereby a user may indicate, via an input mechanism, that an item should be selected for purchase from a web site, and the input mechanism is automatically populated with a quantity value indicating the quantity of the item that is to be purchased. As a result, the user need not separately indicate (1) that the item should be selected for purchase, and (2) the quantity of the item that should be purchased. In one embodiment, a web server provides content to a client system which includes commands that, when executed, cause the input mechanism to be automatically populated with a quantity value upon receiving the user's selection indication. The quantity value may be configurable based on the particular requirements of the web site and/or user.

43 Claims, 9 Drawing Sheets

METHOD AND SYSTEM FOR FACILITATING COMMERCE VIA A COMMUNICATIONS NETWORK

FIELD OF THE INVENTION

The present invention relates to computer systems, and more particularly to computer systems that may facilitate commerce in goods and/or services via communications networks, such as the Internet.

BACKGROUND OF THE INVENTION

The Internet comprises a multitude of computer systems which are connected and exchange information via communications networks. Information may be exchanged between computers connected to the Internet using a service such as the World Wide Web (WWW). The WWW enables a "client" computer system, such as a conventional personal computer or handheld device controlled by a human user, to request one or more information resources from a "server" computer system, such as a web server.

Information resources are uniquely identifiable on the WWW via a Uniform Resource Locator (URL). To request a specific resource, the user of a client computer specifies the URL for the resource in a request, such as a Hypertext Transfer Protocol (HTTP) GET request. The request is sent to the server on which the resource identified by the URL is stored. Upon receiving the request, the server may send the resource to the client. The server may send the resource to the client in any of numerous "markup language" formats, such as in Hypertext Markup Language (HTML), Extensible Markup Language (XML), or Wireless Markup Language (WML) format. In general, markup languages define "tags" that control the display of the resource's text, graphics, controls (such as hyperlinks, which may specify the URL of one or more other resources), and other features on the client computer.

The client may receive and process the resource in markup language format using a browser application. A browser application is a special-purpose program which may execute on the client, and which facilitates the request and display of resources as web pages. Specifically, the browser application may process a resource to display one or more web pages including the text, graphics, controls and other features which are specified by markup tags. The browser may also be configured to execute scripted instructions that may be embedded within the resource in markup language format. For example, many browsers are equipped to process scripted commands which are embedded within a resource, such as instructions provided in Javascript. When executed by a browser, scripted commands may be executed to affect the display of elements on a web page, perform operations on input provided by a user, and other functions. For example, a scripted command may control the display of a data entry form on a page, and validate a user's input to the data entry form.

It is well-known that the WWW may be employed to facilitate commerce. Many web sites exist to allow consumers to purchase goods and services. In particular, many web sites maintain an electronic version of a product catalog, allow users to browse the catalog, select one or more items for purchase, and complete the purchase by providing information such as a name, credit card number and address. Many web sites facilitate selection from the catalog with a first web page, and facilitate purchase of the items in a second web page, via a "shopping cart" metaphor. That is, when a user indicates that an item is to be selected for purchase on the first page, the site creates an association between the item and a collection of items. Then, when the user indicates that the purchase should be completed, the second page is displayed, wherein the collection is designated as being "placed in" the user's shopping cart.

In addition, many web sites display items on a product catalog page such that each item is displayed with a corresponding selection mechanism. That is, when a user wishes to select the item for purchase, the user clicks the item's selection mechanism, and that item is placed in the user's shopping cart. One common example of a selection mechanism is the check box.

Also, many web sites present mechanisms by means of which a user may specify a quantity of each item selected for purchase. For example, some web sites display items on a catalog page with a corresponding selection mechanism and quantity box, so that a user can select an item and specify the quantity of that item to be placed in the shopping cart. Other sites display items with only a selection mechanism on the catalog page, and require the user to specify a quantity on the shopping cart page. Still other sites allow a user to specify a quantity of an item to be ordered on either the catalog or shopping cart page, or using other facilities.

Conventional arrangements, whereby a user separately selects an item and indicates a quantity to purchase, have at least two drawbacks. First, the selection process is more cumbersome for the user than necessary. By requiring that two forms of user input be provided to select a single item, many web sites unnecessarily inflate the time and energy needed to complete a transaction. This drawback may be especially pronounced in situations where a user visits a site periodically to execute repetitive transactions, such as to purchase the same or similar items in varying quantities. By minimizing the time and energy a user expends on a purchase, a site may attract a larger number of customers, persuade each customer to make more frequent purchases, and/or dissuade customers from making purchases from other web sites.

Second, requiring two forms of input to select a single item may confuse a user. For example, a user may assume that if she specifies a quantity for purchase (but does not click the corresponding selection mechanism), the site will "understand" that she wishes to select the item for purchase. However, the site may not be configured to process this type of user indication. As a result, the user may be confused when the item for which the quantity was specified does not appear in the shopping cart. In another example, a user may select an item and specify a quantity for purchase, but then reconsider, and only remove a portion of the input provided (for example, by "un-checking" the item selection check box but leaving the specified quantity intact). Based on this input, the site may place the item in the shopping cart despite the user's wishes, or display a message requesting clarification that further confuses the user. A lack of user confusion is obviously extremely important to a site's ability to complete customer purchases and engender customer loyalty. Moreover, because a web site must be programmed to handle all permutations of user input, accounting for of these scenarios can unnecessarily inflate site development and maintenance costs, which may ultimately be passed on to the customer through higher prices.

SUMMARY OF THE INVENTION

According to one embodiment, a method is provided for execution in a computer system comprising a client component in communication with a server component, the server component configured to receive a request from the client component and serve content to the client component responsive to the request, the content being related to a web site stored on the server component, the client component executing a computer program configured to process the content received from the server component to create a graphical display representative of a portion of the web site, the web site including first and second pages, the first page including at least one item which a user may select for purchase, the second page including at least one item selected for purchase by the user from the at least one item on the first page. The method comprises an act of: (A) serving, by the server component, content to the client component, the content being related to the first page of the web site, the content containing at least one command, wherein the at least one command, when executed by the computer program, causes an input mechanism included in the graphical display to be populated with a quantity value when the user indicates that an item corresponding to the input mechanism is selected for purchase, the quantity value indicating the quantity of the item which is selected for purchase. The method may further include updating, by the user, the quantity value with which the input mechanism is populated.

According to another embodiment, at least one computer-readable medium is provided, encoded with instructions for performing a method in a computer system comprising a client component in communication with a server component, the server component configured to receive a request from the client component and serve content to the client component responsive to the request, the content being related to a web site stored on the server component, the client component executing a computer program configured to process the content received from the server component to create a graphical display representative of a portion of the web site, the web site including first and second pages, the first page including at least one item which a user may select for purchase, the second page including at least one item selected for purchase by the user from the at least one item on the first page. The method comprises an act of: (A) serving, by the server component, content to the client component, the content being related to the first page of the web site, the content containing at least one command, wherein the at least one command, when executed by the computer program, causes an input mechanism included in the graphical display to be populated with a quantity value when the user indicates that an item corresponding to the input mechanism is selected for purchase, the quantity value indicating the quantity of the item which is selected for purchase.

According to yet another embodiment, a server component is provided, in a system comprising a client component in communication with the server component, the client component executing a computer program configured to issue a request to the server component and process content received from the server component to create a graphical display representative of a web site for a user, the server component including: a storage component for storing the web site, the web site including first and second pages, the first page including at least one item which a user may select for purchase, the second page including at least one item selected for purchase by the user from the at least one item on the first page; a request controller to receive the request from the client component; and a content controller for serving the content to the client component responsive to the request, the content being related to the first page of the web site, the content containing at least one command, wherein the at least one command, when executed by the computer program, causes an input mechanism included in the graphical display to be populated with a quantity value when the user indicates that an item corresponding to the input mechanism is selected for purchase, the quantity value indicating the quantity of the item which is selected for purchase. The content controller may further serve content containing at least one command which, when executed by the computer program, causes a corresponding input mechanism for each of a plurality of items to be populated with a respective quantity value when the user indicates that the respective item is selected for purchase, the request controller receives a request from the client component to serve the second page of the web site, and the content controller serves, in response to the request, the second page, wherein the second page includes the plurality of items and the respective quantity value for each of the plurality of items.

BRIEF DESCRIPTION OF THE DRAWINGS

For purposes of clarity, not every component may be labeled in every drawing. In the drawings, in which like components are represented by like numerals.

DETAILED DESCRIPTION

According to some embodiments of the present invention, a system is provided through which a user may, with a single indication, select an item for purchase from a web site and specify the quantity that is to be selected. That is, the user need not provide two separate indications for item selection and the specification of a quantity of the item to be ordered to initiate the purchase of the item. In some embodiments, an input mechanism, such as a text box, is presented to a user. The input mechanism, upon receiving user input such as a mouse click indicating selection of the item, is automatically populated with a value representing a quantity for purchase, which the user may then modify if desired.

The value with which the input mechanism is populated may be any suitable value. For example, the input mechanism may be populated with a value of "1" for a selected item. Alternatively, programmed procedures which perform the population of the input mechanism may be integrated with other system functions, such as those which access one or more data structures that store information on the user or the product. As a result, the input mechanism may be automatically populated with a value which acknowledges the user's previous purchases or activity on the site, or which acknowledges one or more characteristics of the product. For example, upon acknowledging a user who periodically purchases the same product in the same quantity, the system may populate the input mechanism associated with that product with that quantity. In this manner, the system may facilitate transactions that require less time and effort of the user.

Embodiments of the invention may be implemented on any suitable computer system. For example, the input mechanism may be displayed on any suitable graphical display of a web site, such as a browser application which executes on a personal computer, personal digital assistant, cellular phone or other device. The input mechanism may comprise any suitable programmed facility with which user input may be received. For example, the input mechanism may comprise a text box, menu, dialog box or other mechanism. Further, user input may comprise any suitable user indication that a product should be selected for purchase, such as a mouse click, PDA stylus tap, keystroke or other indication.

Figure 1:
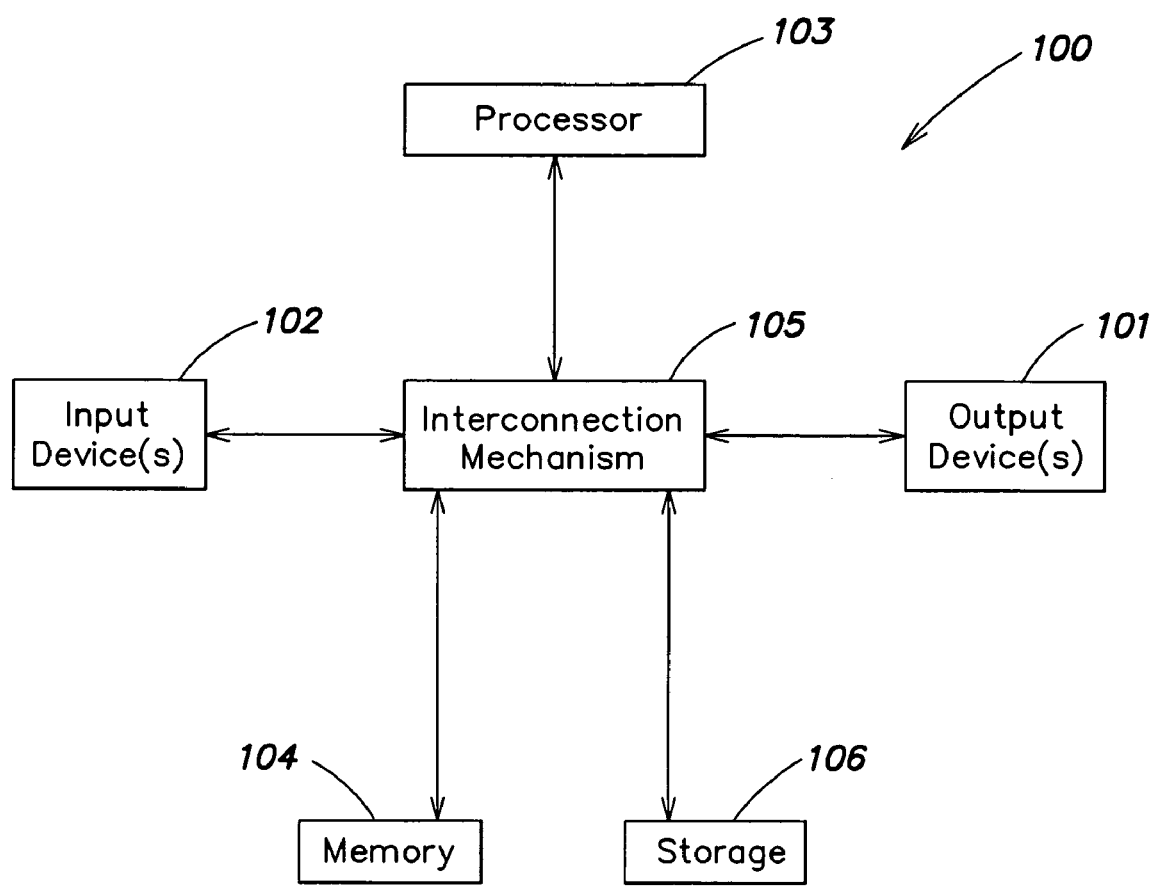
FIG. 1 is a block diagram of an exemplary computer system, with which embodiments of the invention may be implemented.

Computer system 100, shown in FIG. 1, is an exemplary computer system with which aspects of the invention may be implemented. Computer system 100 includes input device(s) 102, output device(s) 101, processor(s) 103, memory system(s) 104 and storage 106, all of which are coupled, directly or indirectly, via interconnection mechanism 105, which may comprise one or more buses, switches, and/or networks. One or more input devices 102 receive input from a user or machine (e.g., a human operator, or programmed process), and one or more output devices 101 display or transmit information to a user or machine (e.g., a liquid crystal display). One or more processors 103 typically execute a computer program called an operating system (e.g., Sun Solaris®, Microsoft Windows®, or other suitable operating system) which controls the execution of other computer programs, and provides scheduling, input/output and other device control, accounting, compilation, storage assignment, data management, memory management, communication and data flow control. Collectively, the processor and operating system define the platform for which application programs in other computer programming languages are written.

The processor(s) 103 may execute one or more programs to implement various functions. These programs may be written in any type of computer programming language, including a procedural programming language, object-oriented programming language, macro language, or combination thereof. Programs may be stored in storage system 106. Storage system 106 may hold information on a volatile or non-volatile medium, and may be fixed or removable. Storage system 106 is shown in greater detail in FIG. 2.

Figure 2:
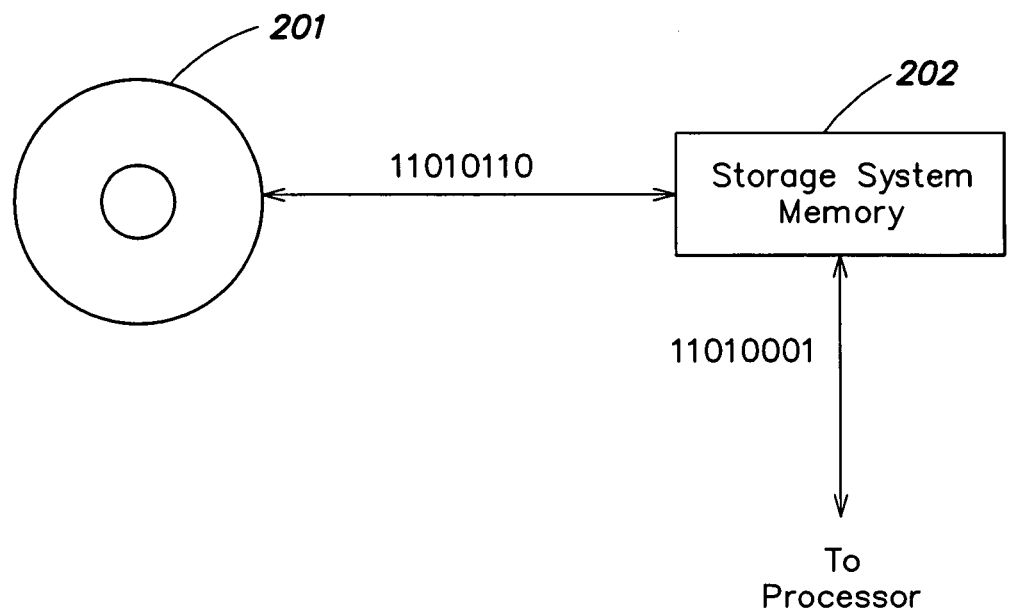
FIG. 2 is a block diagram of an exemplary computer memory, on which programmed instructions comprising illustrative embodiments of the invention may be stored.

Storage system 106 typically includes a computer-readable and -writeable non-volatile recording medium 201, on which signals are stored that define a computer program or information to be used by the program. The medium may, for example, be a disk or flash memory or combination thereof. Typically, in operation, the processor 103 causes data to be read from the non-volatile recording medium 201 into a volatile memory 202 (e.g., a random access memory, or RAM) that allows for faster access to the information by the processor 103 than does the medium 201. This memory 202 may be located in storage system 106, as shown in FIG. 2, or in memory system 104, as shown in FIG. 1. The processor 103 generally manipulates the data within the integrated circuit memory 104, 202 and then copies the data to the medium 201 after processing is completed. A variety of mechanisms are known for managing data movement between the medium 201 and the integrated circuit memory element 104, 202, and the invention is not limited thereto. The invention is also not limited to a particular memory system 104 or storage system 106.

Figure 3:
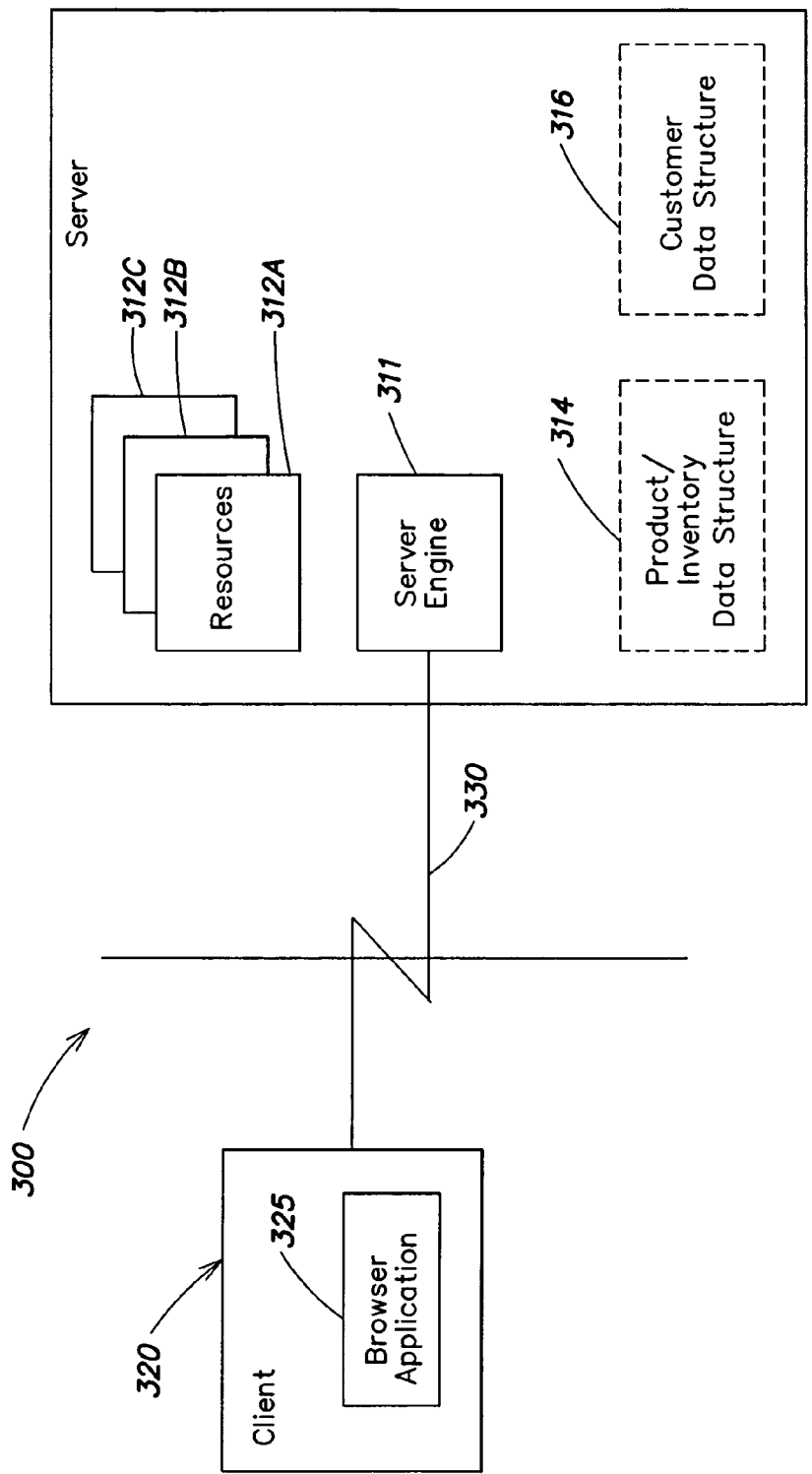
FIG. 3 is a block diagram depicting exemplary client and server systems, between which communication may take place which facilitates aspects of the invention.
Figure 4:
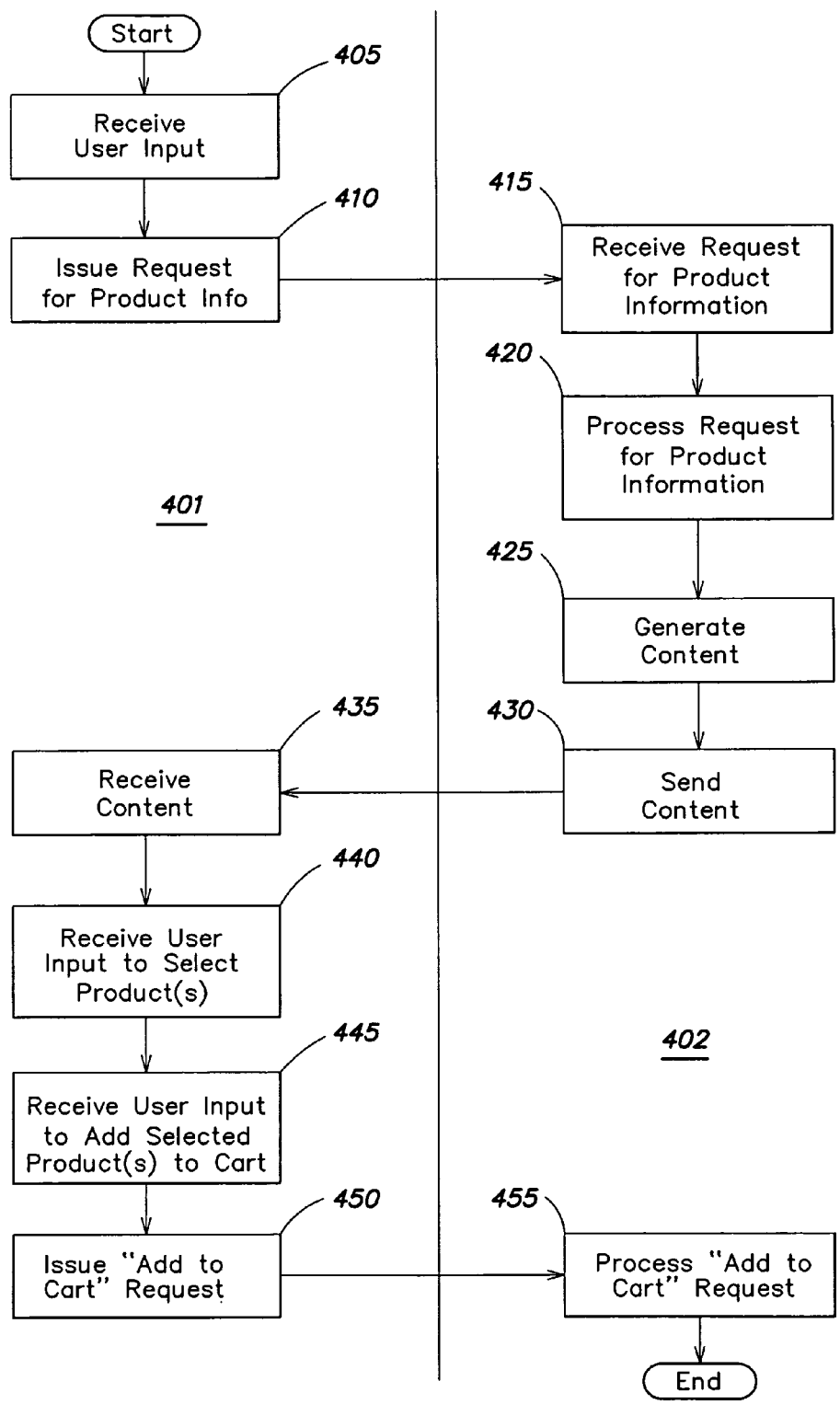
FIG. 4 is a flow chart depicting an exemplary process for selecting an item for purchase from a web site.
Figure 5:
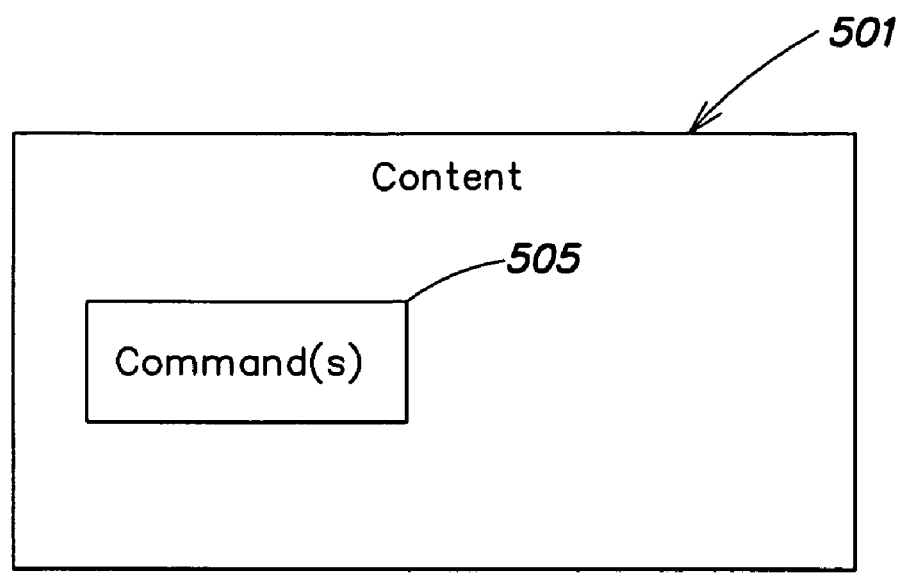
FIG. 5 is a block diagram depicting an exemplary body of content which may be used to facilitate aspects of the invention.
Figure 6:
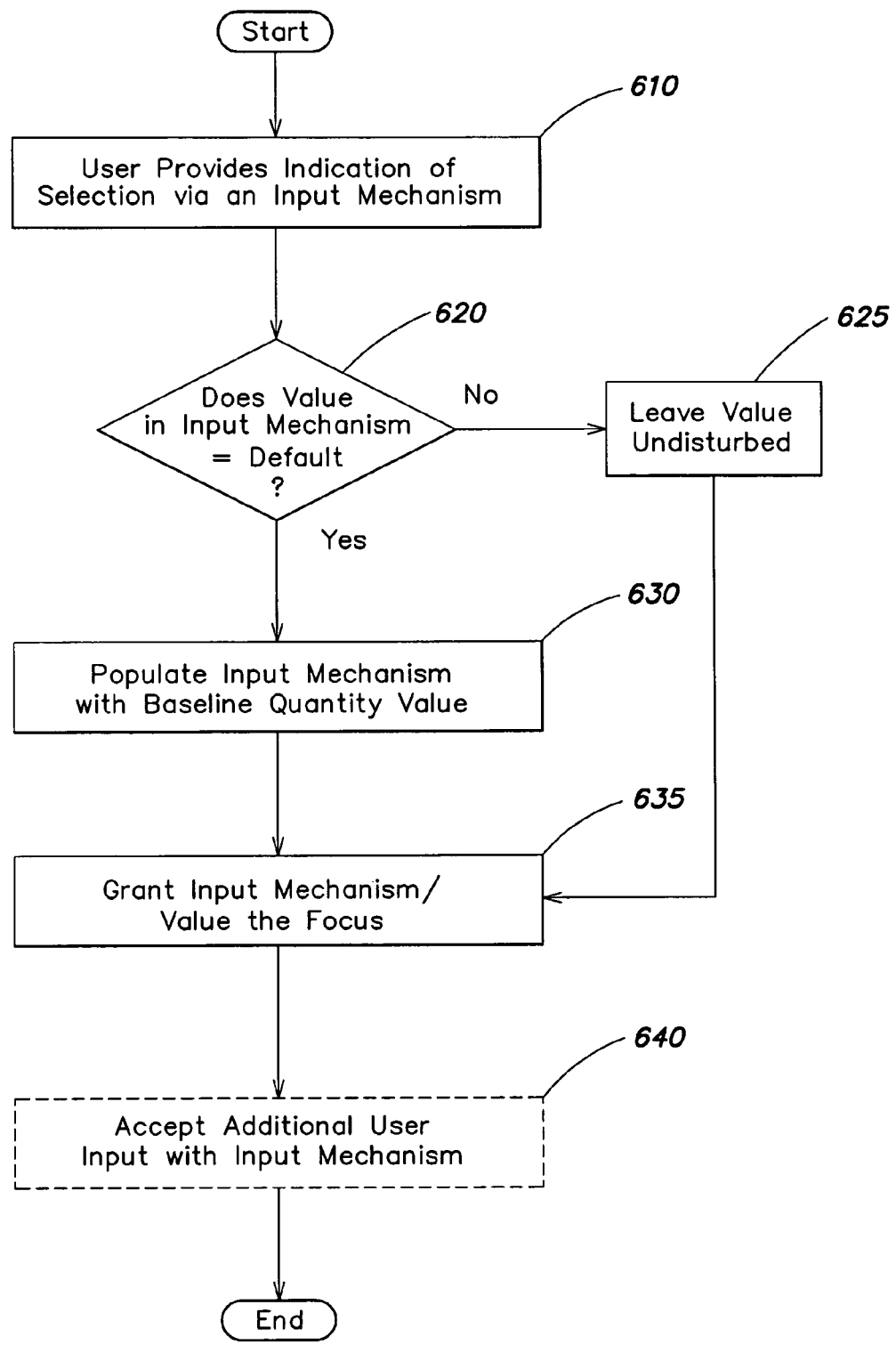
FIG. 6 is a flow chart depicting a process for facilitating user input to select an item for purchase from a web site according to aspects of the invention.

Typically, aspects of the invention involve web-based communication between client and server computer systems, various characteristics of which are depicted in FIGS. 3-7. Specifically, FIG. 3 depicts a client-server system architecture upon which aspects of the invention may be implemented. FIG. 4 depicts a process which may be executed by client and server components during web-based communication according to aspects of the invention. FIG. 5 depicts an exemplary body of content served to a client system which may facilitate aspects of the invention. FIG. 6 depicts a process which may be executed as user input is received at a client system according to some embodiments of the invention. Finally, FIGS. 7A-7D depict illustrate the flow of a client application as a user selects a product for purchase according to embodiments of the invention.

The system architecture of FIG. 3 includes client system 320 and server system 310, which communicate via communications link 330. Client system 320 may comprise a personal computer, personal digital assistant, cellular phone, television, or any other device which may request information (e.g., at the behest of a user) and receives web-based communication in response from server system 310. Client system 320 executes browser application 325, which may be any application program which is capable of displaying information received from server system 310, such as data in markup language, web, or other format.

Server system 310 executes server engine 311, which may include one or more application programs capable of receiving, processing and serving web-based requests from client system 320, such as a web server, application server, other program, or combination thereof. Server system 310 also stores resources 312, which may comprise data that affects the display of information by browser application 325 on client system 320. Specifically, resources 312 may include graphics, page headers, menu bars, and other data which may be served to browser application 325 and affect the graphical display of information thereon. In addition, server system 310 may maintain (as indicated by the dotted lines) either or both of product/inventory data structure 314 and customer data structure 316. Either or both of data structures 314, 316 may comprise a database in order to facilitate easier access thereto, although the invention is not limited in this respect. If maintained on server system 310, each of data structures may comprise any suitable data structure. The components maintained on server system 310 may collectively form one or more web sites that offer goods or services for sale.

Web-based communication between client system 320 and server system 310 typically includes a request issued from client system 320 to a web site on server system 310, and/or information, or "content" (not shown in FIG. 3) which is served by server system 310 to client system 320 in response to such a request. A request may be issued by client system 320 upon receipt of input from a user, such as input provided to browser application 325. For example, a user may employ the browser application to specify a URL for a web site stored on server system 310, and the browser application may encode an HTTP GET command based on this input and send the command to server system 310.

Server engine 311, executing on server system 310, receives the request from client system 320, processes the request (as described below), and provides a response to the request in the form of content via communications link 330. Content may be provided, for example, in markup language format, such as in HTML, XML, WML or other format, or a combination thereof.

Upon receiving a command from client system 320, server engine 311 may dynamically generate the content that is served to client system 320 to satisfy the request. The content may, for example, include one or more resources 312, as well as data from either or both of data structures 314, 316. For example, upon receiving a request from client system 320 on a particular type of product, server engine 311 may query product/inventory data structure 314 to determine the quantity of that type of product that is currently in stock, so that server engine 311 may serve content only on items which are in stock. Alternatively, upon receiving a request from a particular user via browser application 325, server engine 311 may query customer data structure 316 to determine whether the user can be identified as a previous customer of the site, such as with an identifier stored on client system 320 (e.g., an identifier stored in a cookie stored on client system 320). If so, server engine 311 may generate and serve content to client system 320 which acknowledges the user's identity (e.g., the user's name, or a promotional offer on products previously purchased by the customer).

Requests from client system 320 to server system 310, and content served by server system 310 to client system 320 in response, are transmitted via communications link 330. Communications link 330 may include any suitable communications network(s) and device(s), such as the Internet, a Local Area Network (LAN), Wide Area Network (WAN), wireless communications network, other network, or combination thereof. Further, communications link 330 may accomplish data transmission using any suitable communications protocol. For example, the Transmission Control Protocol/Internet Protocol (TCP/IP) protocol may be employed.

FIG. 4 depicts a process which includes web-based communication between a client system and a server system. Specifically, FIG. 4 depicts a process which may be performed when a user of a client system requests information on a product offered for sale by a web site on a server system. Acts performed by the client and server are displayed in columns 401 and 402, respectively. Although the acts performed in the process of FIG. 4 may be illustrated below with a description that references the components depicted in FIG. 3, the process of FIG. 4 may be performed with any suitable system components.

Upon the start of the process of FIG. 4, in act 405, user input is received by an application running on a client system (e.g., browser application 325 in FIG. 3) indicating a request for information on a product. Input may include, for example, the specification of an identifier, such as a URL for a web page containing information on the product. The user may specify the identifier via keystroke, by selecting the identifier from a listing on a menu, by clicking a hyperlink, or using any other suitable technique to specify the item.

Upon the completion of act 405, the process proceeds to act 410, wherein the user's request is sent by the client system to a server system specified or implicated by the request. More particularly, an application executing on the client system, such as browser application 325, formulates one or more commands based on the user's input, and sends the command(s) via a communications link, such as communications link 330, to a network address which is specified or implicated by the user's request. The commands may be encoded and transmitted according to, for example, the HTTP protocol, Wireless Access Protocol (WAP), or other suitable communications protocol. For example, browser application 325 may encode an HTTP GET command based on the user's request for the information specified, and send the command to the Internet Protocol (IP) address specified or implicated by the user's request.

Upon the completion of act 410, the process proceeds to act 415, wherein the request is received by the server system. In some embodiments, the request is received and processed by a web server application, such as server engine 311, although any suitable component(s) may be employed to receive the request. For example, some server systems may employ both web server and application server programs to process incoming user requests.

Upon the completion of act 415, the process proceeds to act 420, wherein the server system begins the fulfillment of the request. As discussed above with reference to FIG. 3, in some embodiments a request may be processed by performing a query on one or more data structures stored on the server system, in order to determine the information that should be sent to the client system in fulfilling the request. For example, if a user requests information on a particular type of item offered for sale by the site (e.g., staplers) and specifies that the information should be displayed in descending order of the price of each item, a database containing information on the items may be queried to determine the price of each, so that the query results may be included in a response to the request, and arranged in accordance with the user's specification.

Upon the completion of act 420, the process proceeds to act 425, wherein content which satisfies the request is generated. The content may include specific data requested by the user, such as that which is returned by a query of a data structure maintained on the server system as discussed above, as well as other information. For example, the content may include data such as a header, footer, and/or other page features and controls formatted according to conventions of a markup language such as HTML, XML, WML, another markup language, or a combination thereof, and sent to a client system.

According to some embodiments of the invention, content may also include one or more commands which, when executed, control the function of various elements displayed by an application on the client system. For example, the commands may control the functions of one or more input mechanisms that enable a user to select one or more products for purchase from a web site.

FIG. 5 depicts an exemplary body of content 501, into which commands 505 are embedded. Body of content 501 may include, for example, data formatted according to any suitable convention, such as according to a markup language like HTML, XML, WML or a combination thereof. Although shown in FIG. 5 to be embedded within the body of content 501, commands 505 may be provided along with the content in any suitable fashion. For example, the commands 505 may alternatively be appended to the end of a data file containing the content. The invention is not limited to a particular implementation.

In some embodiments, the commands may be provided as one or more instructions in script language format, such that they do not require compilation into machine language for execution by a client application. For example, the commands may be provided in Javascript format, such that they are processed with other content (e.g., provided in markup language format) by an application (e.g., a browser application) on the client system. However, the commands are not limited to script language format, as they may be provided in any format suitable for execution by a client application.

In some embodiments, the commands are executed only when the user indicates, via an input mechanism displayed on a web page, that a product is to be selected for purchase. For example, when a user employs a mouse to click on a text box, commands which control the display and function of the text box may be executed by a browser application which displays the text box.

The commands, when executed, may cause any of numerous actions to be performed. For example, the commands may invoke functions of a client application, an application which executes on the server system, another component, or a combination thereof. For example, the commands 505, when executed, may invoke one or more features of a browser application, the operating system running on the client system, other application program, or a combination thereof. In addition to invoking features of other applications, the commands themselves may provide broad functionality, depending on the features of the language in which they are programmed. For example, the commands may control the presentation of an input mechanism (e.g., a text box), and determine whether a user's input to the input mechanism conforms to programmed rules, such as by confirming that a value entered to the input mechanism is allowable. For example, commands may prevent a user from entering an alphabetical value into a text box which should only receive numeric values.

Returning to FIG. 4, upon the completion of act 425, the process proceeds to act 430, wherein content is sent to the client system. The content may be sent, for example, using the communications link 330 depicted in FIG. 3, although any suitable communications device(s) and/or protocol(s) may be employed.

Upon the completion of act 430, the process proceeds to act 435, wherein the content is received at the client system. Upon receipt, the content is processed by an application, such as a browser application, executing on the client system. The content is processed to produce a graphical display within an application of the data requested. For example, a browser application may process the content to display a web page to a user of the application, wherein the web page contains information on products that the user requested in act 405. The web page may display the product information such that each product display is accompanied by an input mechanism with which a user may select the corresponding product for purchase. The commands included within the content may control the function(s) associated with each input mechanism.

Upon the completion of act 435, the process proceeds to act 440, wherein a user indicates, via an input mechanism, that an item is to be selected for purchase. For example, a user employing a browser application to view product information may use a mouse to click on an input mechanism for a product to select it for purchase. In some embodiments, the user's indication via the input mechanism that the product is to be selected for purchase invokes the command(s) which were included in the content in generated in act 425, and received at the client system in act 435.

An exemplary process which may be performed upon a user's indication that a product should be selected for purchase is depicted in FIG. 6. In some embodiments, some or all of the acts described with reference to FIG. 6 are specified programmatically by the commands provided in the content, and are performed when the commands are invoked for execution by the user's indication that a product should be selected for purchase.

At the start of the process of FIG. 6, the user provides an indication that a product should be selected for purchase (but does not specify a quantity) to an input mechanism in act 610. In some embodiments, an indication is provided when the user employs a mouse to click on an input mechanism, such as a text box, within a browser application executing on the client system. However, any suitable form of user input, to any suitable form of selection mechanism, displayed by any suitable client application, may be employed. For example, a user may tap a stylus to provide input to a dialog box displayed by an application running on a PDA, perform a <return> keystroke on a menu entry displayed by an application running on a cell phone, utilize a touch screen to provide input to a box displayed by an application running on a kiosk, or provide voice input to an application running on a personal computer. Any suitable indication via any suitable input mechanism and/or client application may be provided.

Upon the completion of act 610 the process proceeds to act 620, wherein the input mechanism is examined to compare a "current" value contained in the input mechanism at the time of the user's indication to a predefined, configurable "default" value. In some embodiments, the default value is specified by the commands as a value which the input mechanism should contain absent the any user input to the input mechanism. For example, in some embodiments, the default value for an input mechanism may be "0." However, the invention is not limited in this regard, as any default value may be employed.

If it is determined in act 620 that the current value in the input mechanism is equal to the default value, the process proceeds to act 630 wherein the current value is updated to a predefined, configurable "baseline quantity" value (which may also be specified by the commands, and is described below). If it is determined that the current value contained in the input mechanism does not equal the default value, the process proceeds to act 625 wherein the current value is not updated to the baseline quantity value, but rather is left undisturbed.

The determination in act 620 may be performed to preserve previous user input of a quantity provided to the input mechanism. For example, if in act 620 it is determined that the current value equals the default value, perhaps because the value contained in the input mechanism is "null" (e.g., the user clicked on an empty text box) and the default value is "0," the process would proceed to act 630 wherein the input mechanism would be populated automatically with a baseline quantity value (e.g., a value of "1"). If, however, the current value contained in the input mechanism does not equal the default value, perhaps because the user had previously entered a value in the input mechanism (e.g., the user had clicked on a text box and typed a value of "4," and the default value is "0"), the process proceeds to act 625 wherein the value in the input mechanism is left undisturbed by the process. (The user may then update the baseline quantity value using a technique described below with reference to act 640).

If the process proceeds to act 630 (because it is determined in act 620 that the current value contained in the input mechanism is equal to the default value), the current value in the input mechanism is updated to the baseline quantity value. The baseline quantity value may be any value. In the example given above, a baseline quantity value of "1" may represent a quantity which is commonly selected by customers for purchase. For items commonly ordered in larger quantities, the baseline quantity value may be, for example, "12," or any other value. Furthermore, a baseline quantity value may be set according to a customer's previous interaction with the web site, such as previous purchases. For example, if a particular customer periodically purchases the same pen in quantities of 30, then the baseline quantity value associated with that item could be set to "30" when the customer indicates that the product should be selected for purchase. This may be accomplished, for example, with a routine that examines information stored in a data structure on the server system (e.g., customer data structure 316, FIG. 3), and produces commands which are served to the client system that specify a baseline quantity value based on the information.

If the process proceeds to act 625 (because it is determined in act 620 that the current value does not equal the default value), then the value in the text box is left undisturbed. Again, this may be done to preserve the user's previous input. For example, if the default value equals "0," and the current value equals "4" because user had previously entered that value, upon the user's re-indication that the item should be selected, the current value would not be updated to the baseline quantity value. Instead, the current value would remain, so as not to confuse the user.

Upon the completion of either of acts 625 or 630, the process proceeds to act 635, wherein the value in the input mechanism is "given the focus." This may be accomplished in any of numerous ways. For example, in some embodiments, the focus may be granted to the value in an input mechanism shown by a browser on a personal computer by invoking a feature of the operating system that runs on that personal computer. For example, to grant the focus to a value in a text box within a browser application running under Microsoft Windows®, a Windows "on focus" event is invoked, which specifies the text box as the recipient of the user's next data input, such as a keystroke. In some embodiments, the "on focus" event may be invoked by a command provided with the content by the server system. However, the invention is not limited to such an implementation, and any suitable technique of specifying an input mechanism to be the next recipient of user input may be implemented. For example, an input mechanism need not be given the focus by invoking a feature of an operating system running on a client system, but rather may invoke a feature of a program executing on a server system, or any other system component.

Upon the completion of act 635, the process may proceed to act 640 (as indicated by the dotted lines), wherein user input may be provided to the input mechanism. In some embodiments, input may include updating the baseline quantity value. For example, if the baseline quantity value is "1" but the user wishes to order a greater quantity of the corresponding item, the user may specify that quantity via keystroke. Upon the completion of act 640 (or, if act 640 is not performed, upon the completion of act 635), the process completes.

It should be appreciated that a process whereby one or more commands are executed to facilitate a user's selection of an item for purchase need not conform to the specifics of the process of FIG. 6, as any suitable process may be executed. Specifically, some embodiments of the invention may include different acts than those described with reference to FIG. 6, may not include all of the acts described, may perform acts in a different sequence than that which is described, or may otherwise vary from the process described above. In addition, the process described with reference to FIG. 6 (or a variation thereof) may be executed multiple times, such that multiple items are selected for purchase, and a quantity for each selected item may be specified. The invention is not limited to any particular implementation.

Referring again to FIG. 4, upon the completion of act 440, the process proceeds to act 445, wherein the client system receives user input to add the selected item(s), in the specified quantities, to a shopping cart. This may be accomplished in any of numerous ways. For example, a hyperlink or other control may enable a user to indicate that the item(s) should be added to the shopping cart.

Upon the completion of act 445, the process proceeds to act 450, wherein a command based on the "add to shopping cart" request is issued to the server system 310. As with the act 410, this may be accomplished using any suitable communication technique, device(s), and/or protocol(s). Upon the completion of act 450, the process proceeds to act 455, wherein the command is received and processed by the server system 310. This may be performed in any suitable fashion, and is unimportant to an understanding of the invention. Upon the completion of act 455, the process completes.

It should be appreciated that web-based communication performed in accordance with the invention need not conform to the process of FIG. 4. In particular, the process shown in FIG. 4 assumes that the server system provides commands to the client system which are executed by the client only (i.e., without invoking any server-based functions). Nonetheless, according to some embodiments of the invention, some or all of the commands may invoke server-based functions, and may thus initiate more frequent communication between client and server systems. For example, a command may cause a browser application to seek instruction, parameters, or other data from the server system via an HTTP request. Commands may be executed in any suitable fashion, with any suitable component. The invention is not limited to a particular implementation.

The graphical user interfaces of FIGS. 7A-7E illustrate the use of the input mechanism on a client application to select a product for purchase. Each figure depicts graphical user interface (GUI) 700, which may be an interface displayed by a browser application on a client device. GUI 700 displays content which was transmitted by a server system to the client system upon receipt of a request from a user. FIGS. 7A-7D show a progression displayed by GUI 700 as user input is received which indicates the selection of one or more items for purchase.

Figure 7A:
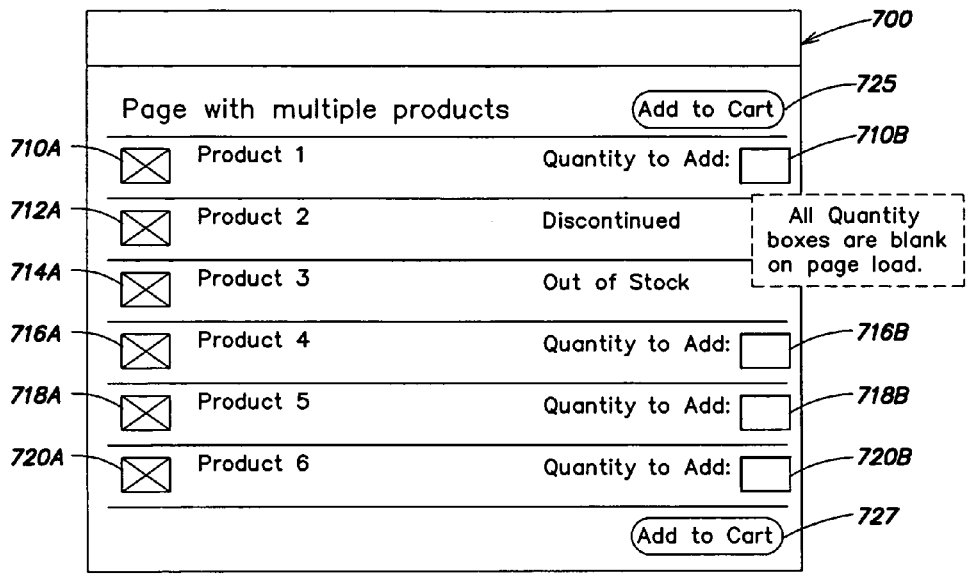
FIGS. 7A through 7E are representations of an exemplary graphical user interface for accepting user input according to aspects of the invention.

In the exemplary display shown in FIG. 7A, GUI 700 presents information on six products 710A, 712A, 714A, 716A, 718A, and 720A. On GUI 700, the products 710A, 716A, 718A, and 720A have corresponding input mechanisms 710B, 716B, 718B and 720B, respectively, while product 712A has no corresponding input mechanism because the product has been discontinued, and product 714A has no corresponding input mechanism because the product is out of stock. This provision of an input mechanism for only certain products may be accomplished, for example, via a query of a data structure, such as a data structure containing product and/or inventory information like data structure 314 (FIG. 3). GUI 700 also displays shopping cart mechanisms 725, 727, which allow a user to add a selected item to a shopping cart, as discussed above with reference to FIG. 4.

Figure 7B:
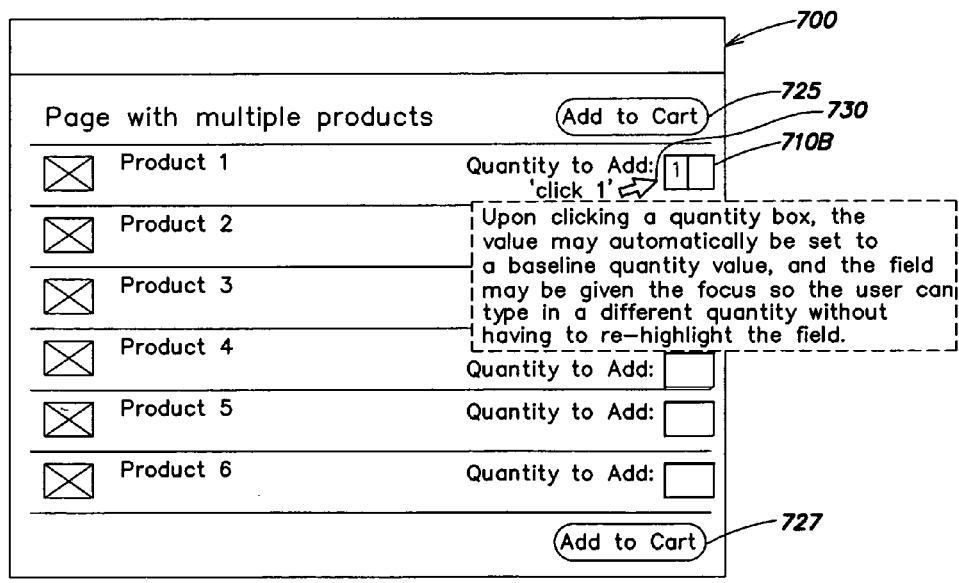

FIG. 7B shows that a user has employed input mechanism 710B (in this example, a text box) to select product 710A for purchase. This is accomplished, in the example shown, via a mouse click on the input mechanism using the cursor 730. As shown in FIG. 7B, upon the selection, text box 710B is automatically populated with a quantity value of "1," without any input from the user except for the mouse click. Also, the value in the text box is given the focus (in the example shown, this is indicated to the user by highlighting the value "1"). The population of box 710B with a value of "1" may be accomplished, for example, according to the process described above with reference to FIG. 6.

Figure 7C:
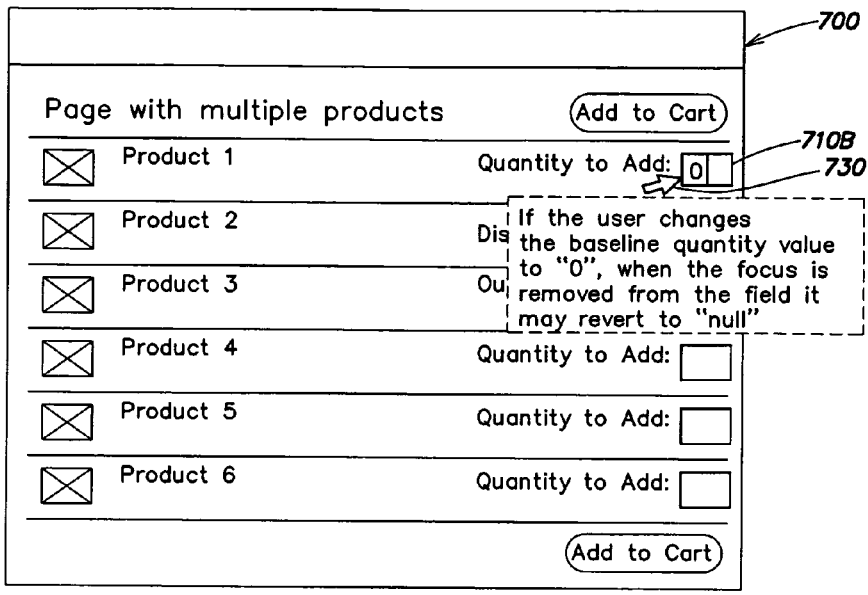

FIG. 7C illustrates a change by the user to the value with which the text box was automatically populated. Specifically, GUI 700 shows that the value in box 710B has been changed from a "1" to a "0." Because the focus had been granted to the value of "1" in FIG. 7B, this may be accomplished with a single user keystroke. More particularly, the user need not select the value of "1" (e.g., with cursor 730) and then execute a keystroke in order to change the value to "0." This feature may minimize the number of steps required of the user to select an item for purchase.

Figure 7D:
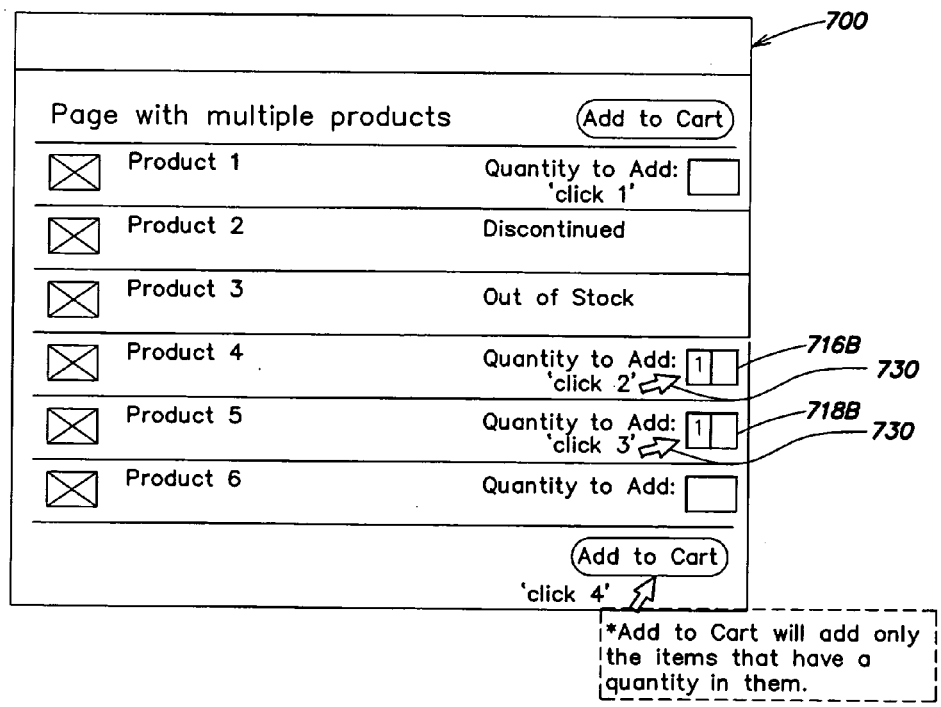
Figure 7E:
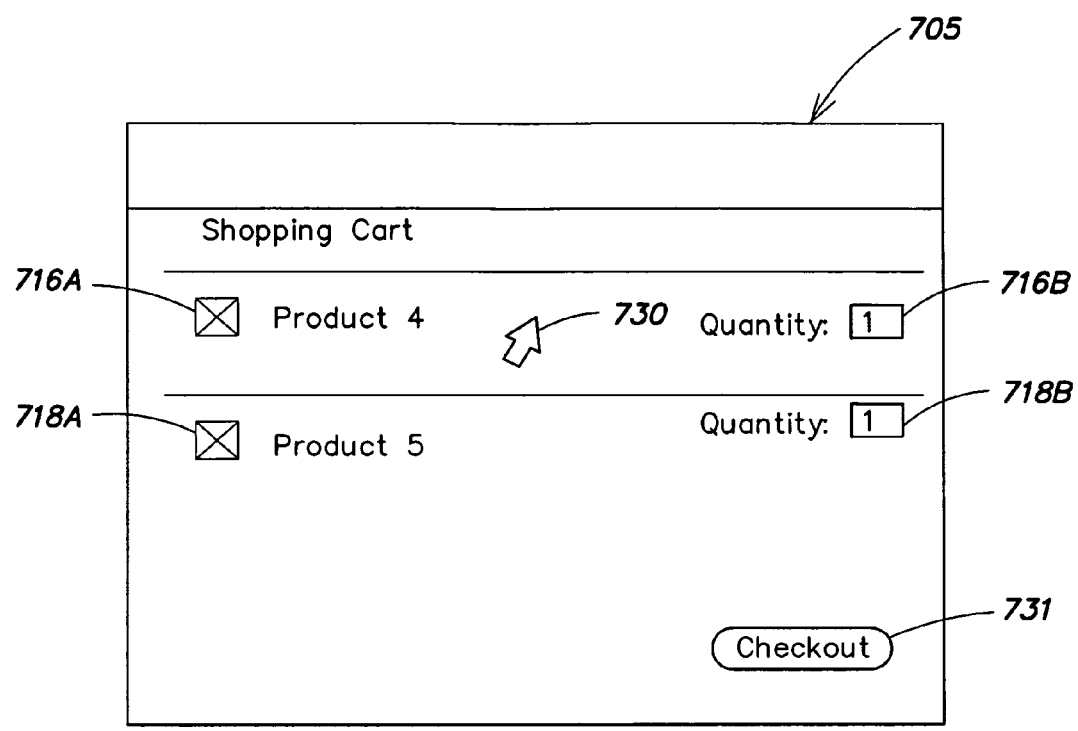

In some embodiments, if the user removes the focus from box 710B while it contains a value of "0" (e.g., by using cursor 730 to select box 716B), the value in box 710B will be automatically updated to "null" to more clearly visually indicate to the user that the product 710A has not been selected for purchase. In FIG. 7D, the value in box 710B has been updated to "null."

It should be appreciated that although FIG. 7C shows that a user has updated the quantity in box 710B from "1" to "0," the user may of course provide input which updates the quantity to any allowable value, wherein the allowable value may be defined by commands like those described above with reference to FIG. 4.

FIG. 7D shows that the user has selected input mechanisms 716B and 718B, thereby causing them to each be automatically populated with a quantity value of "1," and provided no further input to change them from this value. FIG. 7D also shows that the user has directed cursor 730 over icon 727, which causes selected items to be added to a shopping cart for the user. In the example shown, icon 725 also causes selected items to be added to the shopping cart.

By clicking on icon 727, the user may cause the client application which had displayed GUI 700 (e.g., browser application 325, FIG. 3) to replace it with a display of GUI 705, which metaphorically represents the user's shopping cart and displays items selected for placement there, in the respective quantities specified on the interface of FIG. 7D. Once items have been placed in the shopping cart, the user may proceed with a purchase of the items displayed by clicking on icon 731.

Various aspects of the invention, and the exemplary embodiments thereof, may be implemented in any suitable manner. For example, any subset of the above-described features may be implemented in combination, as the invention is not limited to being wholly implemented.

Further, it should be appreciated that one possible implementation of embodiments of the invention comprises at least one computer-readable medium (e.g., a semiconductor memory, magnetic medium and/or optical medium such as floppy disk, compact disk, tape, etc.) encoded with one or more computer programs (i.e., each including a plurality of instructions), which, when executed on a processor or processors, performs some or all of the functions described above of the illustrative embodiments of the present invention. The computer-readable medium can be transportable such that the programs stored thereon can be loaded onto any computer system resource to implement the aspects of the present invention described herein.

In addition, it should be appreciated that the reference to a computer program which, when executed, performs the above-discussed functions, is not limited to an application program running on a computer. Rather, the term computer program is used herein in a generic sense to reference any type of computer code (e.g., software or microcode) that can be employed to program any processor to implement the above-discussed aspects of the present invention.

It should be appreciated that in accordance with several embodiments of the present invention wherein the above-described processes are at least partially implemented with a computer, these processes may, during the course of their execution, receive input manually (e.g., from a user), in the manners described above, or in other manners. In addition, the processes described may receive input from other electronic processes, which may be provided without the active involvement of a human operator.

Having described several embodiments of the invention in detail, various modifications and improvements will readily occur to those skilled in the art. Such modifications and improvements are intended to be within the spirit and scope of the invention. Accordingly, the foregoing description is by way of example only, and is not intended as limiting. The invention is limited only as defined by the following claims and equivalents thereto.

What is claimed is:

1. In a computer system comprising a client component in communication with a server component, the server component configured to receive a request from the client component and serve content to the client component responsive to the request, the content being related to a web site stored on the server component, the client component executing a computer program configured to process the content received from the server component to create a graphical display representative of a portion of the web site, the web site including first and second pages, the first page including at least one item which a user may select for purchase, the second page including at least one item selected for purchase by the user from the at least one item on the first page, a method comprising an act of:

serving, by the server component, content to the client component, the content being related to the first page of the web site, the content containing at least one command, wherein the at least one command, when executed by the computer program, causes an input mechanism included in the graphical display to be automatically populated with a quantity value at a time when the user indicates that an item corresponding to the input mechanism is selected for purchase, the quantity value indicating the quantity of the item for purchase, wherein the quantity is determined based on a previous a interaction between the user and the website.

2. The method of claim 1, wherein the act (A) further includes receiving an update, from the user, to the quantity value with which the input mechanism is populated.

3. The method of claim 1, wherein the act (A) further comprises serving content containing at least one command which, when executed by the computer program, causes a corresponding input mechanism for each of a plurality of items to be populated with a respective quantity value when the user indicates that the respective item is selected for purchase, and wherein the method further comprises acts of:

(B) receiving, by the server component, a request from the client component to serve the second page of the web site; and (C) serving, by the server component, the second page, wherein the second page includes the plurality of items and the respective quantity value for each of the plurality of items.

4. The method of claim 3, wherein the act (A) further includes receiving an update, from the user, to a quantity value for one of the plurality of items selected, and wherein the act (C) further includes serving the second page including the updated quantity value for the corresponding item.

5. The method of claim 1, wherein the act (A) further includes receiving an indication from the user i-that an item is selected for purchase via the input mechanism.

6. The method of claim 1, wherein the server component and the client component comprise separate computer systems, and wherein the client is in communication with the server component via a computer network.

7. The method of claim 1, wherein the client component comprises one of a personal computer, personal digital assistant, cellular phone and television.

8. The method of claim 1, wherein the act (A) further includes, upon receiving the user's indication, performing a comparison between a current value with which the input mechanism is then populated and a default value, and
if the current value equals the default value, causing the input mechanism to be populated with a quantity value; or
if the current value does not equal the default value, leaving the input mechanism populated with the current value.

9. The method of claim 8, wherein the quantity value does not equal the current value.

10. The method of claim 1, wherein the previous interaction comprises a purchase of the item.

11. The method of claim 10, wherein a record of the purchase is maintained in a data structure stored on the server component, wherein the data structure is queried to determine a parameter, wherein the parameter is reflected in the command, and wherein the command, when executed, causes the input mechanism to be populated with a quantity value based on the parameter.

12. The method of claim 1, wherein the act (A) further includes, after receiving the user's indication, giving the input mechanism a focus, wherein the focus specifies that the input mechanism will receive the next input by the user to the computer program.

13. The method of claim 1, wherein the content comprises data which is provided to the client component in a format conforming to a markup language convention.

14. The method of claim 13, wherein the markup language comprises at least one of HTML, XML and WML.

15. The method of claim 1, wherein the computer program is a browser application, and wherein the browser application is configured to process the content served by the server component to create a graphical display for a user.

16. The method of claim 1, wherein the at least one command is executed by the computer program without first compiling the at least one command into machine language format.

17. At least one computer-readable medium encoded with instructions which, when executed for performing a method in a computer system comprising a client component in communication with a server component, the server component configured to receive a request from the client component and serve content to the client component responsive to the request, the content being related to a web site stored on the server component, the client component executing a computer program configured to process the content received from the server component to create a graphical display representative of a portion of the web site, the web site including first and second pages, the first page including at least one item which a user may select for purchase, the second page including at least one item selected for purchase by the user from the at least one item on the first page, perform a method comprising an act of:
serving, by the server component, content to the client component,
the content being related to the first page of the web site,
the content containing at least one command,
wherein the at least one command, when executed by the computer program, causes an input mechanism included in the graphical display to be automatically populated with a quantity value at a time when the user indicates that an item corresponding to the input mechanism is selected for purchase, the quantity value indicating the quantity of the item for purchase,
wherein the quantity is determined based on a previous interaction between the user and the website.

18. The at least one computer-readable medium of claim 17, wherein the act (A) further includes receiving an update, from the user to the quantity value with which the input mechanism is populated.

19. The at least one computer-readable medium of claim 17, wherein the act (A) further comprises serving content containing at least one command which, when executed by the computer program, causes a corresponding input mechanism for each of a plurality of items to be populated with a respective quantity value when the user indicates that the respective item is selected for purchase, and wherein the method further comprises acts of:
(B) receiving, by the server component, a request from the client component to serve the second page of the web site; and
(C) serving, by the server component, the second page, wherein the second page includes the plurality of items and the respective quantity value for each of the plurality of items.

20. The at least one computer-readable medium of claim 19, wherein the act (A) further includes receiving an update, from the user to a quantity value for one of the plurality of items selected, and wherein the act (C) further includes serving the second page including the updated quantity value for the corresponding item.

21. The at least one computer-readable medium of claim 17, wherein the act (A) further includes receiving an indication from the user that an item is selected for purchase via the input mechanism.

22. The at least one computer-readable medium of claim 17, wherein the server component and the client component comprise separate computer systems, and wherein the client is in communication with the server component via a computer network.

23. The at least one computer-readable medium of claim 17, wherein the client component comprises one of a personal computer, personal digital assistant, cellular phone and television.

24. The at least one computer-readable medium of claim 17, wherein the act (A) further includes, upon receiving the user's indication, performina a comparison between a current value with which the input mechanism is then populated and a default value, and
if the current value equals the default value, causing the input mechanism to be populated with a quantity value; or if the current value does not equal the default value, leaving the input mechanism populated with the current value.

25. The at least one computer-readable medium of claim 24, wherein the quantity value does not equal the current value.

26. The at least one computer-readable medium of claim 17, wherein the previous interaction comprises a purchase of the item.

27. The at least one computer-readable medium of claim 26, wherein a record of the purchase is maintained in a data structure stored on the server component, wherein the data structure is queried to determine a parameter, wherein the parameter is reflected in the command, and wherein the command, when executed, causes the input mechanism to be populated with a quantity value based on the parameter.

28. The at least one computer-readable medium of claim 17, wherein the act (A) further includes, after receiving the user's indication, giving the input mechanism a focus, wherein the focus specifies that the input mechanism will receive the next input by the user to the computer program.

29. The at least one computer-readable medium of claim 17, wherein the content comprises data which is provided to the client component in a format conforming to a markup language convention.

30. The at least one computer-readable medium of claim 29, wherein the markup language comprises at least one of HTML, XML and WML.

31. The at least one computer-readable medium of claim 17, wherein the computer program is a browser application, and wherein the browser application is configured to process the content served by the server component to create a graphical display for a user.

32. The at least one computer-readable medium of claim 17, wherein the command is executed by the computer program without first compiling the command into machine language format.

33. A server component in a system comprising a client component in communication with the server component,
the client component executing a computer program configured to issue a request to the server component and process content received from the server component to create a graphical display representative of a web site for a user,
the server component including:
a storage component for storing the web site,
the web site including first and second pages,
the first page including at least one item which a user may select for purchase,
the second page including at least one item selected for purchase by the user from the at least one item on the first page;
a request controller to receive the request from the client component; and
a content controller for serving the content to the client component responsive to the request,
the content being related to the first page of the web site,
the content containing at least one command,
wherein the at least one command, when executed by the computer program, causes an input mechanism included in the graphical display to be automatically populated with a quantity value at a time when the user indicates that an item corresponding to the input mechanism is selected for purchase,
the quantity value indicating the quantity of the item for purchase,
wherein the quantity is determined based on a previous interaction between the user and the website.

34. The server component of claim 33, wherein the content controller further serves content containing at least one command which, when executed by the computer program, causes a corresponding input mechanism for each of a plurality of items to be populated with a respective quantity value when the user indicates that the respective item is selected for purchase, the request controller receives a request from the client component to serve the second page of the web site, and the content controller serves, in response to the request, the second page, wherein the second page includes the plurality of items and the respective quantity value for each of the plurality of items.

35. The server component of claim 33, wherein the server component and the client component comprise separate computer systems, and wherein the client is in communication with the server component via a computer network.

36. The server component of claim 33, wherein the at least one command, when executed, performs a comparison, upon receiving the user's indication, between a current value with which the input mechanism is then populated and a default value, and:
if the current value equals the default value, causes the input mechanism to be populated with a quantity value; or
if the current value does not equal the default value, leaves the input mechanism populated with the current value.

37. The server component of claim 36, wherein the quantity value does not equal the current value.

38. The server component of 33, wherein the previous interaction comprises a purchase of the item.

39. The server component of claim 38, further comprising a data structure in which a record of the purchase is maintained, wherein the content controller queries the data structure to determine a parameter, wherein the at least one command reflects the parameter, and wherein the at least one command, when executed, causes the input mechanism to be populated with a quantity value based on the parameter.

40. The server component of claim 33, wherein the at least one command, when executed by the computer program, upon receiving the user's indication, give the input mechanism a focus, wherein the focus specifies that the input mechanism will receive the next input by the user to the computer program.

41. The server component of claim 33, wherein the content controller serves content comprising data in a format conforming to a markup language convention.

42. The server component of claim 41, wherein the markup language comprises at least one of HTML, XML and WML.

43. The server component of claim 33, wherein the at least one command is executed by the computer program without first compiling the command into machine language format.

* * * * *